July 9, 1940.   H. E. MEARES   2,207,224
NONGLARE DEVICE
Filed Sept. 19, 1939
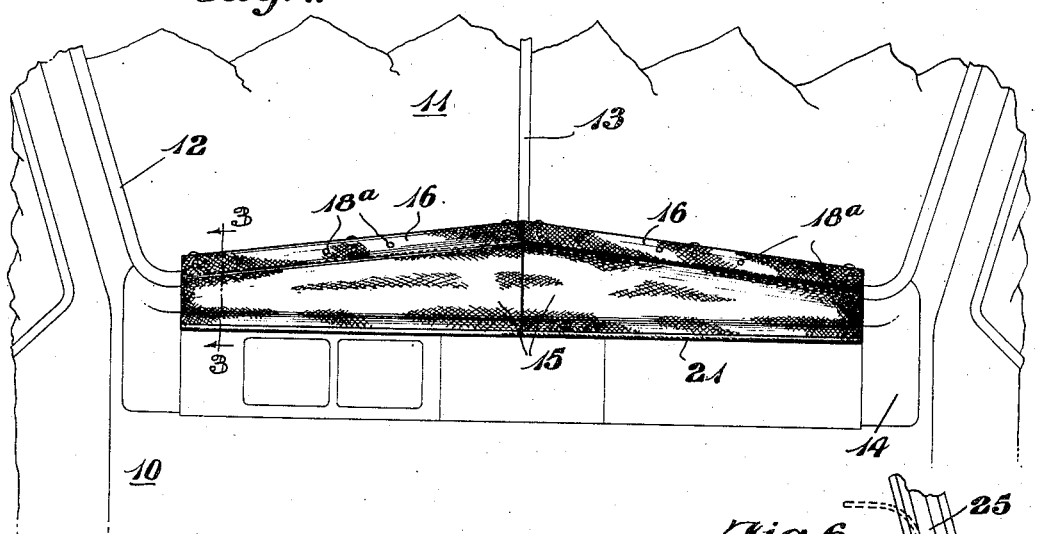
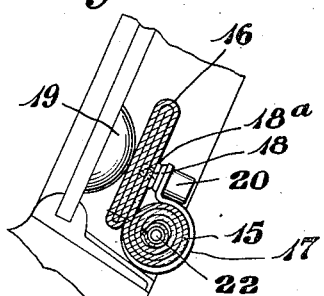
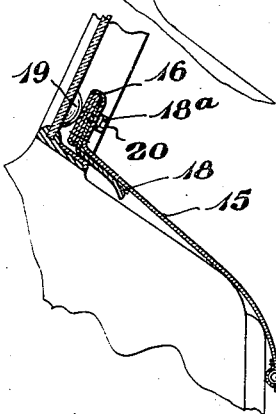
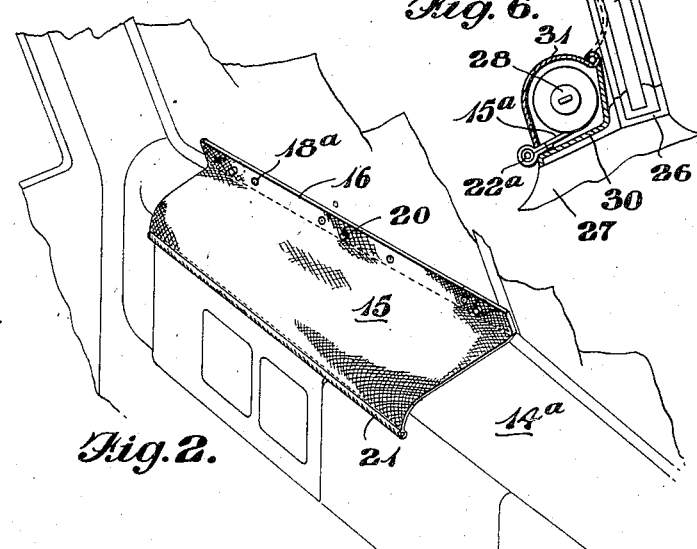
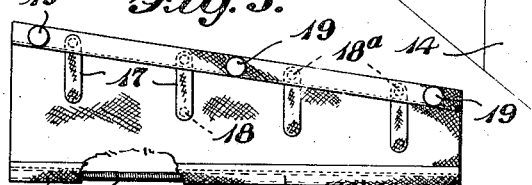
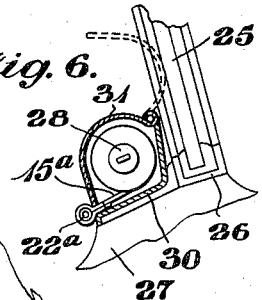
Inventor
Harry E. Meares
By A. Yates Dowell
Attorney Patented July 9, 1940

2,207,224

UNITED STATES PATENT OFFICE 2,207,224

NONGLARE DEVICE

Harry E. Meares, Tampa, Fla.

Application September 19, 1939, Serial No. 295,659

5 Claims. (Cl. 296—97)

This invention relates to nonglare devices for use on automotive and like self-propelled vehicles.

Automotive vehicle bodies of modern construction have the upper portion of the instrument panel at the base of the windshield formed with a flat table-like portion which extends back to the point where the panel is turned downwardly to receive the various indicating instruments, such portion generally having a smooth and finished surface which ofttimes reflects light into the eyes of the driver, causing eye strain and interfering with the vision of the driver.

An object of the present invention is to provide a nonglare device which may be used in the body of an automotive vehicle to cover the portion of the instrument panel at the base of the windshield and which will avoid glare and afford a restful medium for the eyes of the driver, rendering the driving operation more safe and pleasant, particularly over long periods of travel.

Another object of the invention is to provide a device of the type specified which may be readily applied over an instrument panel at the base of the windshield and which when so applied will readily conform to the surface contour of the panel board and at the same time expose the instruments to full view of the driver.

A further object of the invention is to provide a nonglare or eye rest covering for certain surface portions of the interior body of a vehicle which will readily conform to the surface contour of the portion covered, is economical in manufacture, will not mar or otherwise damage the finish of the surface to which it may be applied, and may be readily applied and removed and when not in use rolled up or stored in a compact bundle.

The foregoing and other objects and advantages will become apparent in view of the following description taken in conjunction with the drawing, wherein:

Fig. 1 is a view in perspective of a device constructed in accordance with the features of the present invention, the view being taken from the interior of the vehicle body;

Fig. 2 is a view similar to Fig. 1 but with one section of the device removed;

Fig. 3 is a view in section taken substantially on the line 3—3 of Fig. 1;

Fig. 4 is a view similar to Fig. 3 but showing the body portion of the device in rolled-up condition;

Fig. 5 is a detailed view in plan of one of the sections of the device partly broken away to show the edge weight rod; and, Fig. 6 is a transverse sectional view of a modified type of nonglare device particularly adapted for permanent or inbuilt installation in a vehicle body.

Referring to the drawing in detail, the body of a vehicle body is generally indicated at 10, the said body being provided with the conventional windshield 11, which in the present instance is shown as of V-type construction made up in sections, the windshield being provided with a frame or molding 12 around the outer edges thereof and a central strip 13. At the base of the windshield is the conventional instrument panel 14 having between its upper portion and the base of the windshield a table-like portion 14a lying in a generally horizontal plane. The surface of this latter portion has applied thereto a nonglare covering or shield forming the subject matter of the present invention.

The improved nonglare shield in the specific example shown comprises a main body portion or sheathing 15, preferably made up of suitable flexible material having an outer or exterior nonglare surface or finish. In actual use, cloth has been found satisfactory and readily conforms to the contour of the surface to be covered. Where economy is stressed, the sheathing could be made of treated paper or thin treated cloth. The length and width of the sheathing or body portion of the device should be such as to amply cover the upper or table-like portion of the instrument panel. At its upper edge, the sheathing is formed with a hem or thickened portion 16 which has attached thereto at spaced points tabs 17 provided with snap fasteners 18 adapted to engage coacting snap buttons 18a on the outer side of the hem, note Fig. 2. These tabs and fasteners provide means for holding the sheathing 15 in rolled-up or folded position, as indicated in Fig. 4.

The means for attaching the sheathing to the inside of the windshield in the example shown comprises suction cups 19, which have connected thereto screws adapted to project through the hem 16 and have applied thereto screw caps 20, the latter preferably being nickel or chrome plated to enhance their appearance.

The lower or free edge of the nonglare covering or sheathing 15 is preferably formed with a hem 21, in which is inserted a resilient weight in the form of a rod 22 made of spring windings. By having this rod flexible, or made of material which will readily flex, the sheathing or covering will more readily conform to the contour of the surface to which it is applied.

The manner in which the device operates will be readily apparent from the drawing. Each section is preferably applied to the windshield at the base of the latter above the trim or molding 12 (which is generally chrome-plated or has a bright surface) so that the glare from this member is also obviated. Furthermore, in instances where the windshield wiper or wipers are located at the base of the windshield, glare from the latter will be obviated by the present improved nonglare device. When not in use, the covering portion proper or sheathing 15 is rolled up as illustrated in Fig. 4, and when in this position, the trim or molding 12 of the windshield is still covered. When it is desired to cover the upper or table-like portion 14a of the instrument panel, the tabs 17 are released by disengaging the snap fasteners 18 from their coacting snap buttons 18a, and the device is pulled down over the surface of the portion 14a as indicated in Figs. 1 and 2.

Fig. 6 shows an inbuilt type of nonglare device. In this instance the windshield glass is indicated at 25, the trim or frame portion of the windshield at 26, and the instrument panel at 27. The nonglare sheathing is indicated at 15a and is mounted on a spring roller 28. In the form shown in Fig. 6, a housing 30 is provided and consists of a piece of suitably shaped sheet metal located at the base of the windshield and having a hinged cover 31. When not in use, the cover 31 fits down over and around the roller 28 and constitutes part of the molding or trim of the body. When it is desired to make use of the device, it is simply pulled through a slot provided between the lid and member 30 outwardly the required distance over the surface of the panel board 27. The flexible weight rod is indicated in this instance at 22a.

Another feature of this modified form of nonglare device is that the lid 31 preferably has the interior surface thereof coated or otherwise treated to provide a nonglare surface, and by swinging the latter back as indicated by dotted lines in Fig. 6, an additional amount of glare protection is provided.

It will be understood that certain changes in construction and design may be adopted within the spirit or scope of the present invention as defined by the appended claims.

What is claimed is:

1. A nonglare device for vehicle bodies of that type having a windshield and an instrument panel and a table-like portion or surface between the base of the windshield and the upright portion of the said panel, comprising a sheathing of flexible material such as cloth, fabric or the like, means connected to the upper edge of said sheathing whereby the same may be detachably connected to the windshield at the base of the latter, a flexible rod serving as a weight at the opposite edge of said sheathing, and means for retaining said sheathing in a rolled-up or folded condition.

2. A nonglare device for vehicle bodies of that type having a windshield and an instrument panel and a table-like portion or surface between the base of the windshield and the upright portion of the panel, comprising a sheathing of material having an exterior or outer nonglare surface, the upper edge of the sheathing having secured thereto means whereby the sheathing may be detachably connected to the inner side of the windshield above the trim or frame member of the latter, a flexible rod at the opposite edge of the sheathing maintaining the latter in extended position to conform to the contour of said table-like surface, and means whereby the sheet may be retained in rolled-up condition when not in use.

3. A nonglare device for vehicle bodies of the type having a windshield and an instrument panel and a relatively flat table-like portion or surface between the base of the windshield and the instrument panel, comprising a sheathing or covering of material having a nonglare surface, such for example as cloth, fibrous material or the like, suction cups for detachably connecting the upper edge of the sheet to the windshield at the base of the latter, snap fasteners and coacting tabs for holding the sheet in a folded or rolled-up position at the base of the windshield when not in use, and a flexible rod at the lower edge of the sheet serving as a weight for maintaining the sheathing in extended position.

4. A nonglare device for vehicle bodies of that type having a windshield and an instrument panel and a table-like portion or surface between the base of the windshield and the upright portion of the instrument panel, comprising a sheathing of flexible material adapted to conform to the contour of said surface, a spring roller on which said sheathing is mounted, and a housing at the base of the windshield simulating the trim of the vehicle body, said roller being mounted in said housing and the latter being formed with a slot through which the sheathing is withdrawn, said housing being provided with a hinged lid, the interior surface of which is of non-glare material providing an additional nonglare protective portion when the lid is in raised position.

5. A nonglare device for vehicles of that type having a windshield and an instrument panel with a table-like portion or surface between the base of the windshield and said panel, comprising a sheathing of flexible material such as fabric or the like having a nonglare surface, means for detachably connecting the upper edge of said sheathing to the vehicle body adjacent the base of the windshield, a weight at the opposite edge of said sheathing adapted to hold the sheathing in unfolded position over said table-like portion, and means for retaining said sheathing in a rolled up or folded condition.

HARRY E. MEARES.